United States Patent
Halstead, Jr. et al.

(10) Patent No.: US 6,473,093 B1
(45) Date of Patent: Oct. 29, 2002

(54) PROCESSING OF GRAPHICAL OBJECTS WITH DISTINCT STRETCH AND COMPRESSION PROPERTIES

(75) Inventors: Robert H. Halstead, Jr., Belmont, MA (US); David E. Hollingsworth, Watertown, MA (US)

(73) Assignee: Curl Corporation, Cambridge, MA (US)

(*) Notice: Subject to any disclaimer, the term of this patent is extended or adjusted under 35 U.S.C. 154(b) by 0 days.

(21) Appl. No.: 09/364,700

(22) Filed: Jul. 30, 1999

(51) Int. Cl.[7] .................................................. G06F 11/00
(52) U.S. Cl. ........................ 345/619; 345/764; 345/781; 345/800
(58) Field of Search ................................. 345/348, 349, 345/433, 434, 435, 333, 334, 339, 341, 342, 437–439, 619, 620–625, 676–678, 700, 708, 764, 782, 780–784, 799, 811, 800–803, 813, 815, 781; 382/305, 312, 232; 709/203, 217, 219

(56) References Cited

U.S. PATENT DOCUMENTS

| | | | |
|---|---|---|---|
| 4,799,172 A | 1/1989 | Wood et al. | 364/518 |
| 5,148,520 A | 9/1992 | Morgan | 395/148 |
| 5,208,906 A | 5/1993 | Morgan | 395/148 |
| 5,649,216 A * | 7/1997 | Sieber | 395/767 |
| 5,721,848 A * | 2/1998 | Joseph | 395/339 |
| 5,754,873 A * | 5/1998 | Nolan | 345/529 |
| 5,796,401 A * | 8/1998 | Winer | 345/433 |
| 5,953,735 A | 9/1999 | Forcier | 707/541 |
| 5,973,692 A * | 10/1999 | Knowlton | 345/348 |
| 6,057,842 A * | 5/2000 | Knowlton et al. | 345/348 |
| 6,125,385 A * | 9/2000 | Wies | 709/203 |
| 6,154,757 A * | 11/2000 | Krause et al. | 707/530 |
| 6,181,838 B1 * | 1/2001 | Knowlton | 382/305 |

FOREIGN PATENT DOCUMENTS

EP 0 848 351 A2 6/1998

OTHER PUBLICATIONS

Knuth, D.E., *The TeXbook*, (Addison Wesley, 1998).

(List continued on next page.)

*Primary Examiner*—Matthew Luu
*Assistant Examiner*—Wesener Sajous
(74) *Attorney, Agent, or Firm*—Hamilton, Brook, Smith & Reynolds, P.C.

(57) ABSTRACT

To process the layout of graphical objects, elastics data structures are established for the graphical objects to define minimum and preferred sizes, stretch properties and compression properties. Composite graphical objects include elastics properties computed from their components through add and max operations which are dependent on relative elasticities of the components. The positions of origins within graphical objects are defined by pairs of elastics in each of two dimensions. One application of elastics is with respect to text blocks where preferred width and compressibility of each text block is a function of the amount of text in the text block. The elastics and dimensions of graphical objects are processed in a three pass layout negotiation. In the first pass, preferred sizes and elasticities of the graphical objects are computed along a first dimension. In a second pass, size values of the graphical objects along the first dimension are computed from the preferred sizes and elasticities, and preferred sizes and elasticities of the graphical objects along a second dimension are computed based on the size values of the graphical objects along the first dimension. In a final pass, size values of the graphical objects along the second dimension are computed from the preferred sizes and elasticities.

29 Claims, 11 Drawing Sheets

OTHER PUBLICATIONS

"Scripting Languages: Automating the Web," *World Wide Web II* (2), Spring 1997, http://www.w3j.com/6/ (downloaded Jul. 27, 1999).

Hostetter et al., "Curl, A Gentle Slope Language for the Web," *World Wide Web Journal* (Spring, 1997), http://www.w3z.com/6/s3.kranz.html (downloaded Jul. 27, 1999).

Linton, Mark A. et al., "Composing User Interfaces With InterViews," IEEE, vol. 22, No. 2, pp. 8–22, Feb. 1, 1999.

Haarslev V., et al., "Visualization and Graphical Layout in Object–Oriented Systems," Journal of Visual Language and Computing, vol. 3, No. 1, pp. 1–12, Mar. 1992.

Myers, Brad A. et al., "Garnet Comprehensive Support for Graphical Highly Interactive Use Interfaces," IEEE, vol. 23, No. 11, pp. 71–85, Nov. 1, 1990.

\* cited by examiner

FIG. 5
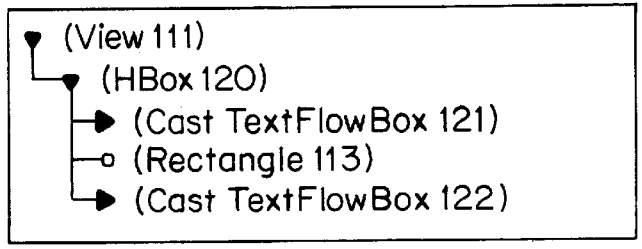
FIG. 6
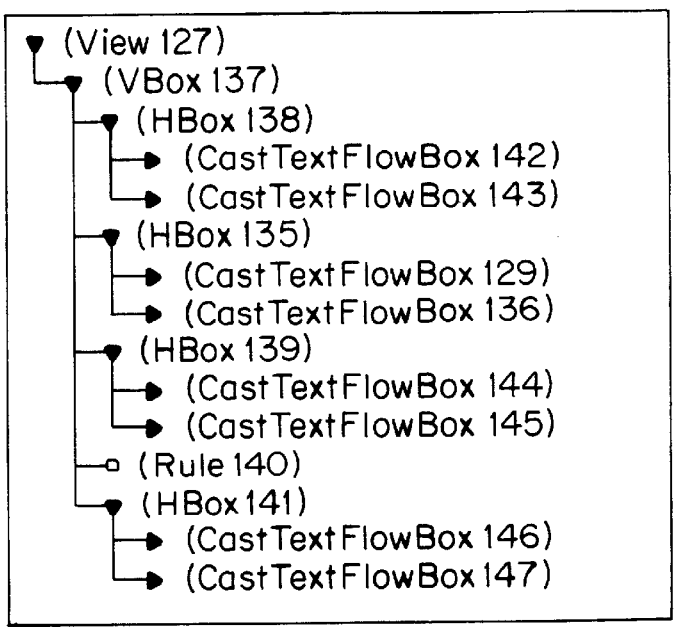
FIG. 7
FIG. 8

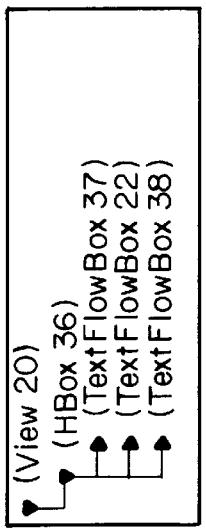

| Here is a rather long line of text, which will therefore be quite stretchy | Here is something quite a bit shorter | This one is is intermediate in length between the others |

FIG. 16

PROCESSING OF GRAPHICAL OBJECTS WITH DISTINCT STRETCH AND COMPRESSION PROPERTIES

TeX is a widely used text formatting program developed by Donald Knuth. Donald E. Knuth, *The TeXBook*, Addison-Wesley, Reading, Mass. 1984. TeX uses a concept known as "glue" to express dimensional preferences of fill objects and incorporates different stretch and compression orders that can be used to describe the stretchiness and compressibility of different kinds of fill objects. As the overall dimensions of a layout change, the dimensions of individual fill objects change dependent on preferred sizes and stretchiness of those objects.

A graphics tool kit developed by Robert Halstead called Stk incorporates the concept of an elastic, known as "glue," having a minimum size, a stretchiness coefficient and a stretch order associated with graphical objects having content. The tool kit formalizes the layout computations of horizontal and vertical boxes of graphical objects in terms of elastic add, max and divide operations. Stk is not widely known or used. The layout mechanism of Stk was incorporated into Swat, a graphics toolkit developed at MIT by Harold Abelson, James Miller and Natalya Cohen.

SUMMARY OF THE INVENTION

In accordance with the present invention, a system, method and data structure are provided to facilitate the layout of graphical objects. Distinct stretch and compression properties are defined for unit graphical objects with content. Those properties are processed to define individual layouts of the graphical objects within an overall graphical layout. The preferred data structure defining elastics comprises a size value, a stretch property, and a compression property independent of the stretch property. Processing is facilitated by associating the elastics directly with unit, i.e., leaf, graphical objects having content as opposed to being associated merely with fill objects which surround the content objects.

Preferably, the stretch properties comprise stretchiness coefficients to be applied to sizes designated for the graphical objects, and the compression properties comprise compressibility coefficients to be applied to the sizes designated for the graphical objects. The stretch and compression properties may comprise stretch and compression orders to indicate substantial relative differences between stretchiness and compressibility relative to those properties of other graphical objects. Stretch and compression properties of the graphical objects may also be defined through compact representations which share like stretch and compression properties.

Preferably, the data structures defining elastics of the graphical objects define minimum and preferred sizes of the graphical objects, and those minimum and preferred sizes are processed to define the individual layouts.

Various operations can be applied to the graphical objects. In an add operation, the stretchiness and compressibility coefficients of plural graphical objects are summed dependent on the relative stretch and compression orders. Specifically, the stretchiness and compressibility coefficients, respectively, are summed if the respective stretch and compression orders are equal, and if the respective stretch and compression orders are not equal, an add result includes the stretchiness and compressibility coefficients of the graphical object indicated to be most elastic by the stretch and compression orders. The stretch and compress orders, respectively, having the greatest elasticity may be taken as the order of properties of the add result.

In a max operation, a size is selected from two graphical objects dependent on the relative compressibility and stretchability of the graphical objects. A max result is the size of the graphical object whose elasticity toward the other size is the least. The stretch and compression properties of the max result are selected from the graphical object from which size was selected or, if the size of the two graphical objects is the same, from the graphical object which was least elastic.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 illustrates the use of vertical origins to align a graphical object with the baseline of a line of text.

FIG. 6 presents the hierarchy of the graphical objects displayed in FIG. 5.

FIG. 7 illustrates the use of horizontal origins to align a column of numbers.

FIG. 8 presents the hierarchy of graphical objects displayed in FIG. 7.

FIG. 13 illustrates the graphical hierarchy for a horizontal arrangement of three text boxes.

FIG. 14 illustrates the horizontal arrangement of the three text boxes of FIG. 13 when given their preferred widths.

FIG. 15 illustrates the horizontal arrangement of the three text boxes of FIG. 14 when given somewhat less than their preferred widths.

FIG. 16 illustrates the horizontal arrangement of the three text boxes of FIGS. 14 and 15 when given significantly less than their preferred widths.

DETAILED DESCRIPTION OF THE INVENTION

One of the jobs faced by any 2-D graphics system is computing the layout (the positions and sizes) of the objects to be displayed. Graphical displays in the Curl programming language are constructed by grouping primitive "leaf graphics" into larger assemblies by placing them inside graphical containers known as Boxes. Boxes can in turn be placed within other Boxes and in this way arbitrarily complex graphical displays can be constructed.

The leaf graphics can include several kinds of graphical objects:

1. Simple geometrical shapes such as rectangles and ellipses, whose sizes may either be specified in the Curl program or may be computed at layout time, as specified in the program. Simple character strings such as labels also fall into this category.
2. Images and other graphics that can be scaled, but should be scaled in a way that preserves their aspect ratio (the ratio of width to height).
3. Blocks of formatted text, where the width and height can be scaled but must have an approximately inverse relationship to each other. (If the width decreases, the height must increase.)

Figure 1:
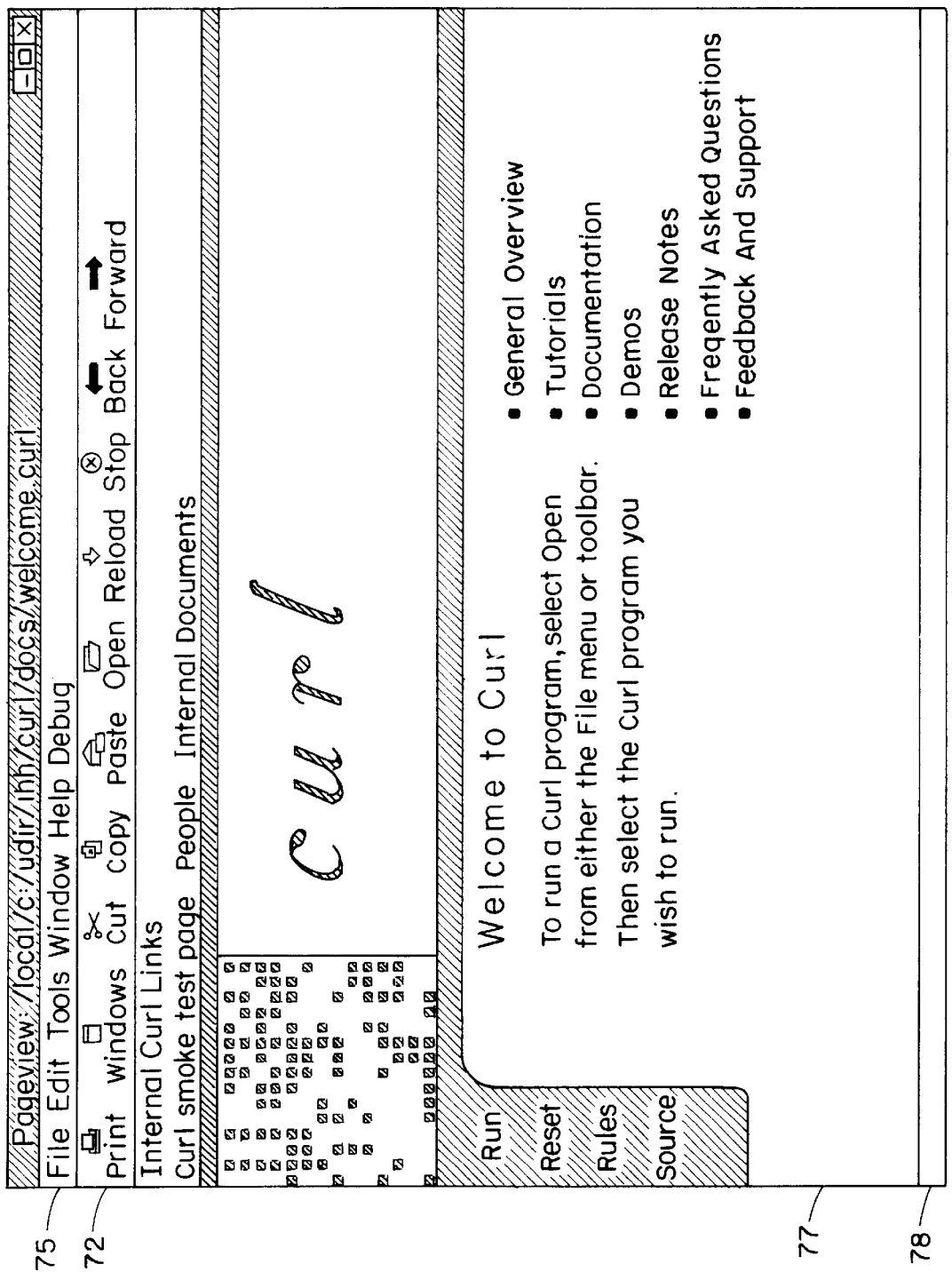
FIG. 1 presents an example display window including a large number of graphical objects to illustrate an application of the invention.
Figure 2:
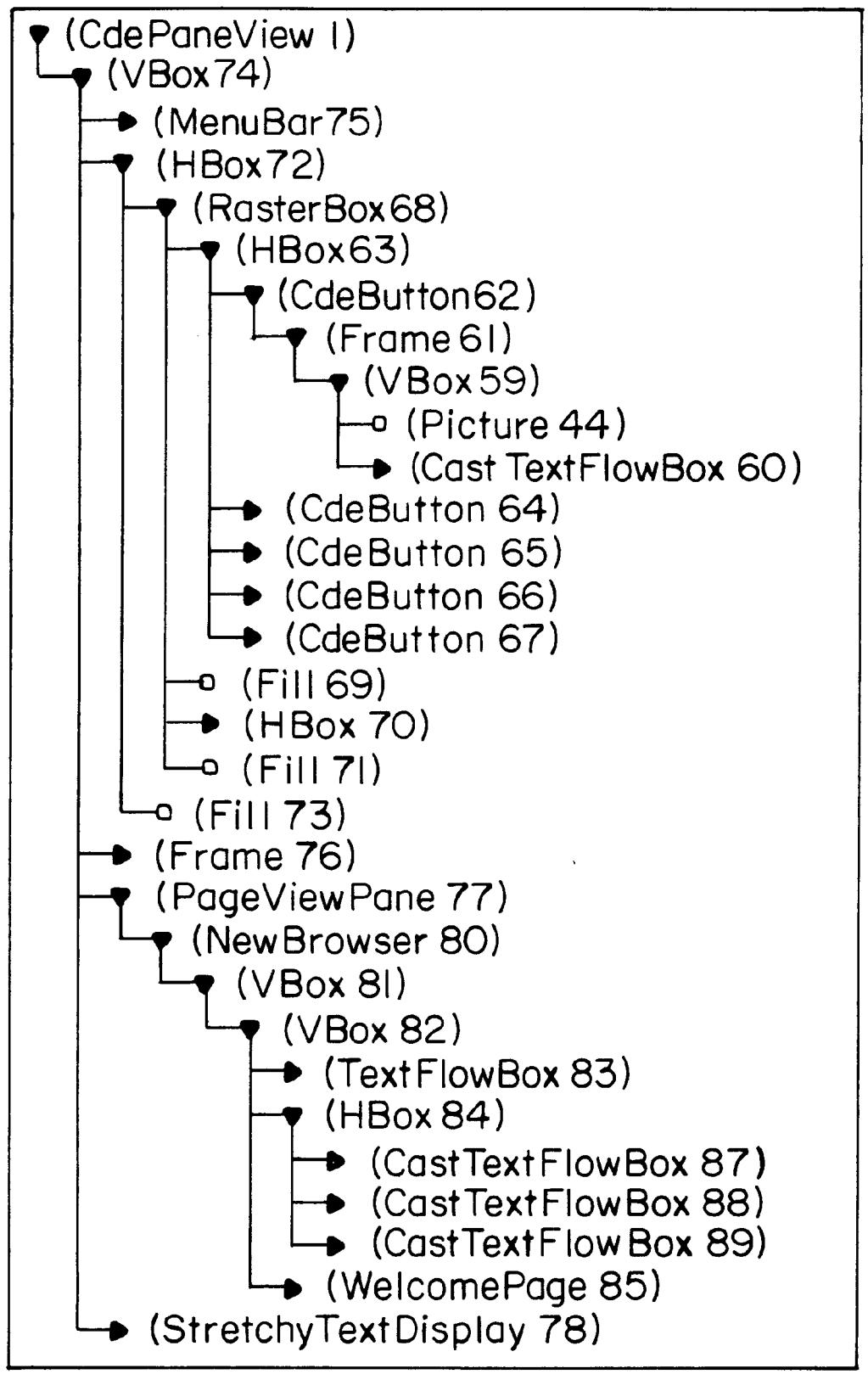
FIG. 2 is a partial view of the hierarchy of graphical objects displayed in the window of FIG. 1.

FIG. 1 shows a typical Curl window containing a large number of graphical objects, including both leaf graphics and Boxes. FIG. 2 shows the structure of the graphical objects that are visible in FIG. 1, rendered in a partly expanded outline form. Each graphical object, whether a Box or a leaf graphic, is shown in FIG. 2 on a single line with a name such as "{VBox 74}" that indicates the type of the object (VBox) and includes a unique number (74) designating the particular object associated with this line of the diagram. Each Box is shown on a line containing a triangle icon to the left of the Box's name, while each leaf graphic is shown with a square icon next to the graphic's name. When the triangle icon corresponding to a Box points down, as in {VBox 74} or {HBox 63}, the graphics contained within the box are shown on subsequent lines by means of the line connected to the bottom of the triangle that links the triangle with the icon of each object contained directly as a child of the Box. When a Box's triangle points to the right, as in {CdeButton 64} or {HBox 70}, the Box may have children that, for brevity, are not shown. However, not all Boxes that are shown with rightward-pointing triangles actually have child objects. For example, {CastTextFlowBox 60} has no child objects.

The diagram of FIG. 2 shows that the top-level object in FIG. 1 is {CdePaneView 1}, which in turn has {VBox 74} as its single graphical child. {VBox 74}, in turn, has several child objects, each of which fills the pane horizontally and which are arranged from top to bottom. {MenuBar 75} is the menu bar object which defines the menu bar 75 in FIG. 1, containing the words "File", "Edit", etc. {HBox 72} is the toolbar object that lies next below these words. FIG. 2 shows this HBox expanded to show the separate CdeButton objects that correspond to the toolbuttons labeled "Print", "Windows", etc. {CdeButton 62} is the "Print" toolbutton, which in turn has been expanded to show that it contains a Frame object {Frame 61}, which in turn contains {VBox 59}. Finally, {VBox 59} is the entity that stacks up the printer icon {Picture 44} and the word "Print" which is contained within {CastTextFlowBox 60}. The other objects displayed in FIG. 1 are grouped in a similar fashion: notably, {PageViewPane 77} corresponds to the large region containing the words "Welcome to Curl" and the associated text and graphics, while {StretchyTextDisplay 78} corresponds to the blank status pane at the very bottom of the screen, which from time to time displays messages indicating the state of the application program that is running.

Since Curl supports all of these kinds of graphics and since any combination of them can be put together in a Box, Curl needs a solution, provided by its layout system, to the following two basic problems:

1. Representing the size preferences of graphical objects that may be either simple leaf graphics or composite graphics (i.e., Boxes). This representation must be such that a Box can query its component graphics for their size preferences and combine those results into a representation of the size preference of the Box itself. The representation must be able to encode the size preferences of both rigid objects, such as many simple graphics, and stretchy objects such as images and formatted text.

In Curl, this role is played by "elastics." As discussed in greater detail below, elastics are defined for heights and widths of individual graphical objects. The elastics for composite graphical objects are computed from the elastics of their components.

2. Computing graphical layouts in a way that takes into account the size preferences of both rigid and stretchy objects. The existence of stretchy objects that enforce a relationship between height and width, such as both constant-aspect-ratio images and blocks of formatted text, make this problem more complicated.

In Curl, this role is played by a three-pass layout negotiation algorithm that has two forms: width-first and height-first. The width-first algorithm collects width preferences in the first pass through the graphical object tree, computes width assignments and collects height preferences in the second pass, and computes height assignments in the third pass. The height-first algorithm is similar but interchanges the roles of height and width. By collecting height preferences after width assignments are known (or vice versa in the case of height-first layout), this algorithm accommodates objects whose height and width preferences are not independent of each other.

The General Concept of Elastics

Figure 3A:
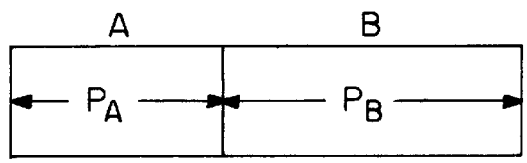
FIGS. 3A–E illustrate the concept of elasticity where two graphical objects are varied in size to fill varying window widths.
Figure 3B:
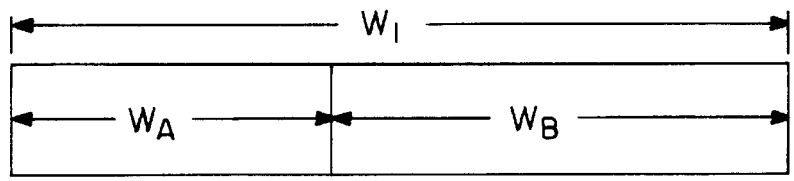
Figure 3C:
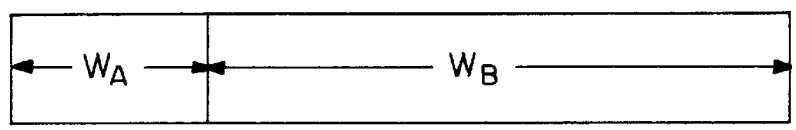
Figure 3D:
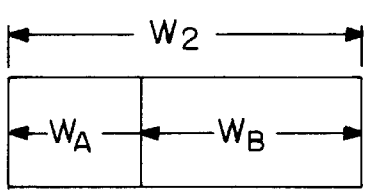
Figure 3E:
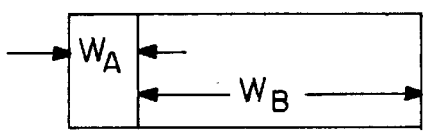

Graphical objects in a layout may have preferred dimensions. For example, in FIG. 3, two side-by-side graphical objects A and B may have preferred widths $P_A$ and $P_B$. However, to meet hardware display dimensions or window dimensions within the display where a user expands or shrinks a window containing the graphical objects A and B, the widths of A and B must vary in order to fill a space or to avoid clipping peripheral features from the view. For example, if the two objects A and B must fill a width $W_1$, the two objects might expand proportionately to the resulting widths $W_A$ and $W_B$ illustrated in FIG. 3B. The result of FIG. 3B assumes that the two graphical objects are of the same elasticity with respect to expansion, that is, they are of the same stretchability. However, by defining elastics for each graphical object, one object might be caused to stretch preferentially to the other. For example, if the object B is defined to be highly stretchable relative to object A, object A may remain at its preferred width $P_A$, with all expansion to fill the fall width $W_1$ being borne by the object B as illustrated in FIG. 3C. Similarly, if the combined objects must be reduced to a reduced width $W_2$, the two objects might be compressed proportionately as illustrated in FIG. 3D. On the other hand, object A may be defined to have higher compressibility such that a larger share of compression is borne by object A as illustrated in FIG. 3E.

An elastic represents behavior much like that of a mechanical spring. Like a spring, an elastic has a "preferred size" which is its length when not subjected to any deforming forces. Like a spring, when an elastic is compressed to a smaller size than its preferred size, the elastic can be thought of as exerting a force that opposes that compression. This force increases as the degree of compression increases, but unlike simple mechanical springs, an elastic in general can display discontinuous changes in the strength of the force or the rate of change of the force with respect to changes in the length of the elastic.

If instead of being compressed, an elastic is stretched to a length greater than its preferred size, then it can be thought of as opposing the stretching with a force that, like the compressive force, increases with the magnitude of the deformation.

As is the case with springs, different elastics can have different degrees of stretchiness or compressibility. The greatest degrees of stretchiness or compressibility are associated with the elastics that exhibit the smallest forces opposing a given deformation.

Unlike physical springs, elastics can also have different "orders" of stretchiness or compressibility. An elastic with a higher stretch (or compress) order is infinitely stretchier (or more compressible) than one with a lower stretch (or compress) order. If two elastics with different stretch orders are put end to end and the assembly is stretched, the elastic with the lower stretch order will remain at its preferred size and all of the extra distance will be accounted for by stretching the elastic with the larger stretch order.

If the two elastics in this scenario have the same stretch order, however, then they will both stretch. Each elastic is stretched to the length that causes the forces opposing the stretch in the two elastics to be equal. In practice, this means that if one of the elastics is N times stretchier than the other, then the amount by which that elastic stretches beyond its preferred size will be N times greater than the amount of stretch that is apportioned to the other elastic.

If instead of being stretched, the assembly of two elastics is compressed below its preferred size, the behavior is analogous to that described above except that stretching is replaced by compression.

For performing graphical layout, elastics are used to represent the height and width preferences of graphical objects, and therefore it is necessary to be able to:
1. Combine the elastics that describe graphics in a Box to produce elastics that describe the height and width preferences of the Box itself.
2. Given a height or width assignment of a Box as a whole, and given the height or width elastics of the graphics within the Box, compute the height or width assignment for each of those graphics.

To support these needs, elastics must support certain fundamental operations:
1. The "add" operation corresponds to placing two elastics end to end. It would be used, for example, to compute the width elastic of a Box that contains two or more graphics arranged in a horizontal row as in FIG. 3.
2. The "max" operation corresponds to laying two elastics side by side. It would be used, for example, to compute the height elastic of a Box containing several graphics arranged in a horizontal row.
3. The "divide" operation is applied to two elastics and a length. It computes the portion of the length that should be apportioned to each elastic if the two elastics were placed end to end and that assembly stretched or compressed to take on the specified length. It would be used, for example, by a Box containing two graphics arranged in a horizontal row as in FIG. 3, to compute the width assignment for each graphic, given a specified width assignment for the Box. As discussed below, this operation can be used together with the add operation to apportion a specified width or height among any number of objects that are arranged in a sequence along the dimension of interest.

In addition to these fundamental operations, there are some other operations that also figure into Curl's use of elastics:
4. The "scale" operation "multiplies" an elastic times a number N>0. If N is an integer, the result is the same as that produced by putting N copies of the elastic end to end using the add operation. If N is not an integer, then the result is interpolated in the obvious way between the results corresponding to the two integer values nearest to N.
5. The "equal" operation on two elastics returns true if the two elastics exert the same force at all sizes.
6. The "equal at size" operation applies to two elastics and a specified length. It returns true if the two elastics exert the same force when deformed to the given length.

Other operators, such as "subtract," can also be envisioned.

Implementation of Elastics in the Curl Language

While the general concept of elastics described above is a powerful basis for layout computation, it can be expensive to implement in its most general form. Accordingly, Curl implements an approximation to the general elastic concept described above. Curl's approximation has the following properties:
1. It is capable of representing elastics whose stretchiness (and stretch order) differs from their compressibility (and compress order).
2. It incorporates the notion of a "minimum size." Curl's elastics very strongly resist compression to a size less than their minimum size.
3. There is a bound on how large the representation of an elastic can grow as add, max, and the other operations listed above are performed on it. No elastic representation that has this property can yield exact results for all possible elastic operations, so Curl yields approximate results for add, max, and other operations where that is necessary to keep the size of the result from growing.
4. There are compact representations for some of the more commonly occurring elastic values. For example, elastics whose stretchiness and compressibility are equal can be represented more compactly than general elastics for which this equality does not hold.

In summary, the standard Curl elastic has six fields:
1. The minimum size (a floating-point number).
2. The preferred size (a floating-point number).
3. The compressibility coefficient (a floating-point number).
4. The compress order (an integer).
5. The stretchiness coefficient (a floating-point number).
6. The stretch order (an integer).

A Curl object representing an elastic has a type code (as all Curl objects do) plus fields containing the above values. Compact representations of special-case elastics have a different type code and a subset of the above fields. The values associated with the missing fields are computed by reference to the type code and to the fields that are supplied in the compact representation. For example, the type code StretchyElastic is associated with an object that contains fields (1)–(4) from the list above. When values corresponding to fields (5) or (6) are needed, they are supplied by providing the values from fields (3) and (4), respectively.

Another example of a compact elastic representation is RigidElastic, which has only a preferred size field. When values corresponding to the other fields are needed, they are computed so that the minimum size equals the preferred size and fields (3)–(6) have values that are associated with a standard "rigid" object.

Implementation of the Fundamental Elastic Operations in the Curl Language

Curl's implementation of the fundamental elastic operations can be described in terms of the standard six elastic fields, as follows.

The add operation produces a result with the following fields:

1. The minimum size is the sum of the operands' minimum sizes.
2. The preferred size is the sum of the operands' preferred sizes.
3. The compressibility coefficient is the sum of the operands' compressibility coefficients if both operands have the same compress order. Otherwise the compressibility coefficient of the result is equal to the compressibility coefficient of whichever operand had the greater compress order.
4. The compress order is equal to the greater of the operands' compress orders.
5. The stretchiness coefficient is the sum of the operands' stretchiness coefficients if both operands have the same stretch order. Otherwise the stretchiness coefficient of the result is equal to the stretchiness coefficient of whichever operand had the greater stretch order.
6. The stretch order is equal to the greater of the operands' stretch orders.

The elastic produced according to these rules is sometimes only an approximation of the ideal result of the add operation. For example, if an elastic A with a small preferred size and a large compress order is added to an elastic B with a large preferred size and a small compress order, the compress order of the resulting elastic C will be equal to that of A and the preferred size of C will be the sum of those of A and B. Thus, C will be an easily compressible elastic that remains easily compressible even after its size is reduced to less than the preferred size of B alone. This behavior differs from the behavior of a physical system of springs. In the physical system, once the highly compressible elastic A had been compressed to zero length, no further compression of A would be possible and the elastic C would then become more difficult to compress, corresponding to B's compress order.

Although the add operation as described here is only approximate, it has the virtue of being able to represent its result in a fixed amount of space. Every scheme that produces the ideal result from elastic add operations must require increasing amounts of space as the results of add operations are themselves provided as operands to further add operations, leading to space and time costs that must be balanced against the increased fidelity of the result. The approximation described above can be computed efficiently and gives good results in practice.

The max operation on two elastics A and B produces a result with the following fields:

1. The minimum size is the greater of the operands' minimum sizes.
2. The preferred size favors the preferred size of the elastic which is least elastic toward the preferred size of the other. Elasticity is determined first by order and, if order is equal, by comparing coefficients. Since one elastic must stretch to match the other while the other must compress to match the first, the elasticity comparisons are comparisons of compressibility against stretchiness. More specifically, the preferred size is equal to the preferred size of A if

* the preferred size of A is greater than that of B and either
    (i) the compress order of A is less than the stretch order of B, or
    (ii) the compress order of A equals the stretch order of B and the compressibility coefficient of A is less than or equal to the stretchiness coefficient of B; or
  * the preferred size of A is less than that of B and either
    (i) the stretch order of A is less than the compress order of B, or
    (ii) the stretch order of A equals the compress order of B and the stretchiness coefficient of A is less than the compressibility coefficient of B.

Otherwise, the preferred size of the result is equal to the preferred size of B.

3. The compressibility coefficient is the compressibility coefficient of the elastic whose preferred size was chosen for the value of the preferred size field (2). If both operands have the same preferred size, then if the operands have different compress orders, the compressibility coefficient associated with the lesser compress order is used; otherwise, the lesser of the two compressibility coefficients is used.
4. The compress order is the compress order associated with the compressibility coefficient chosen for field (3).
5. The stretchiness coefficient is the stretchiness coefficient of the elastic whose preferred size was chosen for the value of field (2). If both operands have the same preferred size, then if the operands have different stretch orders, the stretchiness coefficient associated with the lesser stretch order is used; otherwise, the lesser of the two stretchiness coefficients is used.
6. The stretch order is the stretch order associated with the stretchiness coefficient chosen for field (5).

Like the add implementation described above, this implementation of the max operation produces only an approximate result in some situations. For example, suppose an elastic A has a small preferred size and a small compress order, while an elastic B has a larger preferred size and a larger compress order. If the stretch orders of A and B are greater than B's compress order, then the preferred size of the elastic C that is the max of A and B will be equal to the preferred size of B. Likewise, C's compressibility and compress order will be equal to those of B and hence C will be easily compressible. Based on the analogy to physical springs, we might expect C to become more difficult to compress once the preferred size of A is reached, but if the elastic C is computed according to the rules outlined above, this will not happen.

As in the case of the add operation, total fidelity in the max operation must be accompanied by an inability to bound the space and time required to compute the result. The approximation described above is used because it can be computed efficiently and gives good results in practice.

The divide operation on two elastics A and B and a length x, written as divide(A,B,x), produces a length of the object having the elastic A. The divide operation is performed as follows:

1. If x is less than the sum of the two elastics' minimum sizes, then the length x is divided in proportion to the elastics' minimum sizes. Thus, the result of the divide operation will be $$\frac{x * A.minimum\text{-}size}{A.minimum\text{-}size + B.minimum\text{-}size}$$

2. Otherwise, an excess (or deficit) e is computed by subtracting the sum of the two elastics' preferred sizes from x. e is apportioned between the two elastics as follows:
   a. If e is an excess and the two elastics have equal stretch orders, divide e in proportion to the two elastics' stretchiness coefficients. Thus, the excess that is apportioned to elastic A is given by $$\frac{e * A.stretchiness}{A.stretchiness + B.stretchiness}$$

b. If e is a deficit and the two elastics have equal compress orders, divide e in proportion to the two elastics' compressibility coefficients.
   c. If e is an excess and the two elastics have unequal stretch orders, apportion all of e to the elastic with the greater stretch order.
   d. If e is a deficit and the two elastics have unequal compress orders, apportion all of e to the elastic with the greater compress order.

The result of the divide operation is then the sum of A's preferred size and the portion of e that was apportioned to A, except that this result is adjusted if necessary to avoid assigning either to A or to B a size less than its minimum size.

The scale operation applies a scale factor f to an elastic A. The parameters of the resulting elastic are computed from those of A as follows:

1. The minimum size is f times the minimum size of A.
2. The preferred size is f times the preferred size of A.
3. The compressibility coefficient is f times the compressibility coefficient of A.
4. The compress order is equal to the compress order of A.
5. The stretchiness coefficient is f times the stretchiness coefficient of A.
6. The stretch order is equal to the stretch order of A.

Other elastic operations are implemented in an analogous way.

Graphical Origins and Dimensions

As discussed above, Curl uses elastics to describe size preferences for graphical objects. Each such object has a width and a height and also has an "origin" point that lies somewhere within those bounds. The origin is a useful way to represent, for example, the location of the baseline of a line of text that extends both below and above the baseline. Origins can also be useful for vertical alignments: for example, if numbers are rendered into text strings whose origins are at the location of their decimal points, then the decimal points of a column of numbers can be aligned simply by aligning their origins.

Figure 4:
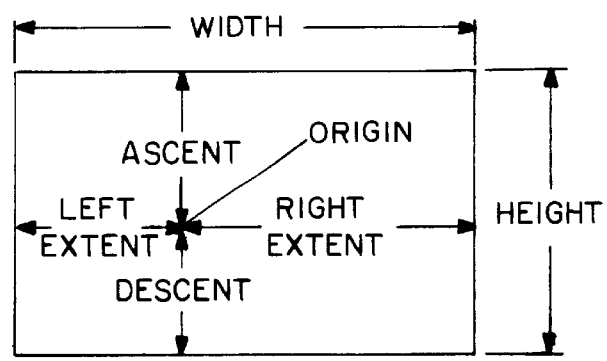
FIG. 4 illustrates left and right extents, ascent and descent relative to an origin in a graphical object.

Accounting for origins, there are four size preferences to be described using elastics as illustrated in FIG. 4:

1. The distance from an object's origin to its top (the object's "ascent").
2. The distance from an object's origin to its bottom (the object's "descent").
3. The distance from an object's origin to its left edge (the object's "left extent").
4. The distance from an object's origin to its right edge (the object's "right extent").

It is convenient to bundle together the elastics describing size preferences for ascent and descent into a single unit describing size preferences in the vertical dimension, and similarly it is convenient to bundle together the elastics that describe preferences for an object's left and right extents. Accordingly, the Curl implementation provides a class OriginElastic that contains a pair of elastic objects describing size preferences on the two sides of an origin point.

Simple graphics such as pictures and rectangles simply synthesize suitable elastics to describe their size preferences based on internal parameters such as the number of pixels in the picture. Graphical containers, on the other hand, generate their elastics by combining their component graphics' elastics using the elastic operations discussed above.

The Use of Elastics by HBoxes and VBoxes

For example, Curl has a container known as HBox that places a collection of graphics in a horizontal row. HBox has several options that make it possible to specify that the components of the HBox should be aligned by their origins, bottoms, tops, or centers. If we consider an HBox that aligns its components' origins, then the origin of the HBox itself will be collocated with the origin of the first (leftmost) object in the HBox, and the origins of all the other components of the HBox will be aligned on the same horizontal line as the origin of the HBox itself.

FIG. 5 illustrates an HBox containing three objects: a CastTextFlowBox, a Rectangle, and another CastTextFlowBox. FIG. 6 illustrates the graphic hierarchy of this HBox. This particular HBox is arranged to align the vertical origins of the component objects. Rectangle produces an elastic that requests an origin at the lower left-hand corner of the rectangle, while text produces elastic that requests an origin at the left-hand end of the text and aligned with the baseline of the text. Thus when these three objects are displayed within this HBox, the bottom of the Rectangle is aligned with the baseline of the text, which is generally the alignment that would be desired. The use of origins enables this alignment even though the bottom of each text block is below the text block's baseline, as is illustrated by the positions of the descender characters "y" and "g" in the text blocks.

FIG. 7 illustrates a VBox containing several objects that have been aligned by their horizontal origins. As this figure illustrates, lining up decimal points in a column of numbers is one application for aligning horizontal origins. FIG. 8 shows the graphic hierarchy corresponding to FIG. 7 fully expanded so that all objects that appear in FIG. 7 are shown explicitly in FIG. 8. It would be possible in Curl to create a graphical object containing text whose origin would be located just to the left of the decimal point for all text strings that represent decimal numbers, but since no such object is built into Curl, each row of digits is constructed as an HBox containing two text blocks, the first containing the material to the left of the decimal point and the second containing the decimal point and the material to its right, if any. Each HBox has been configured so as to put its origin at the right-hand end of the first text block. The Rule object is responsible for displaying the horizontal line just below "33.333". The Rule object is configured to have a fixed height of $\frac{1}{72}$ inch but its width is stretchy, so it automatically conforms its width to the width of the VBox itself.

In a scenario such as that of FIG. 5, the left extent elastic of the HBox will simply be the left extent elastic of the first component. The right extent elastic of the HBox is computed by using the elastic add operation to combine the right extent elastic of the first component with the left and right extent elastics of all the remaining components. The ascent elastic of the HBox is computed by using the elastic max operation to combine the ascent elastics of all the HBox's components, and the descent elastic of the HBox is likewise computed by using the elastic max operation to combine the descent elastics of all the HBox's components.

The above discussion explains how the elastics that describe an HBox's size preferences are computed from the elastics that describe the size preferences of the HBox's graphical children. The other part of the picture is the use of these elastics to make layout decisions. In a width-first layout negotiation, after an HBox computes its width elastics, the HBox's graphical parent will eventually determine numerical values for the HBox's left and right extents and will communicate those values to the HBox. The HBox uses this information, in combination with the width elastics obtained earlier from the HBox's graphical children, to calculate the left and right extents, as well as the horizontal origin location, for each of the HBox's graphical children.

Figure 9:
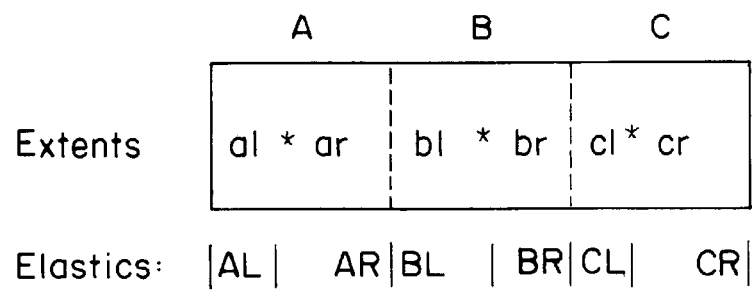
FIG. 9 illustrates the left and right extents of three graphical objects of an HBox and the corresponding elastics.

The left extent of the HBox's first child is easily computed, since it is just equal to the left extent of the HBox itself, but computing the remaining left and right extents of the HBox's children is a more complex task. Consider the case of an HBox with three graphical children A, B, and C, as shown in FIG. 9. The origin of each object is marked by an "*".

The left extents of A, B, and C are denoted by al, bl, and cl, respectively, and the right extents of A, B, and C are denoted by ar, br, and cr, respectively. The symbols AL, AR, etc., stand for the corresponding elastics that describe the width preferences of A, B, and C used to compute the extents.

As noted earlier, al is equal to the left extent of the HBox as a whole, but the sum ar+bl+br+cl+cr must be made equal to the right extent of the HBox. There are several methods for computing these values. A simple method proceeds from right to left by means of successive applications of the elastic divide operation. The first such divide operation computes $$cr=\text{divide}(CR, AR+BL+BR+CL, r)$$

where r is the right extent of the HBox and AR+BL+BR+CL is the elastic sum of the four elastics AR, BL, BR, and CL. The second divide operation computes $$cl=\text{divide}(CL, AR+BL+BR, r-cr)$$

The third computes $$br=\text{divide}(BR, AR+BL, r-cr-cl)$$

and the computation proceeds in this way until all of the required extents have been computed. This procedure generalizes in the obvious way to HBoxes that have more or less than three graphical children.

An alternative method differs from this method but produces the same result. The alternative method first computes cl+cr as $$cl+cr=\text{divide}(CL+CR, AR+BL+BR, r)$$

and then decomposes that result into its components cl and cr as follows:

$$cl=\text{divide}(CL, CR, cl+cr)$$

$$cr=(cl+cr)-cl$$

Further iterations of the same method yield bl+br followed by bl and br, and so on. This method slightly simplifies the computations, described later, by which an HBox computes the amount of padding to be inserted, if necessary, around comparatively rigid graphical objects contained within the HBox.

Figure 18:
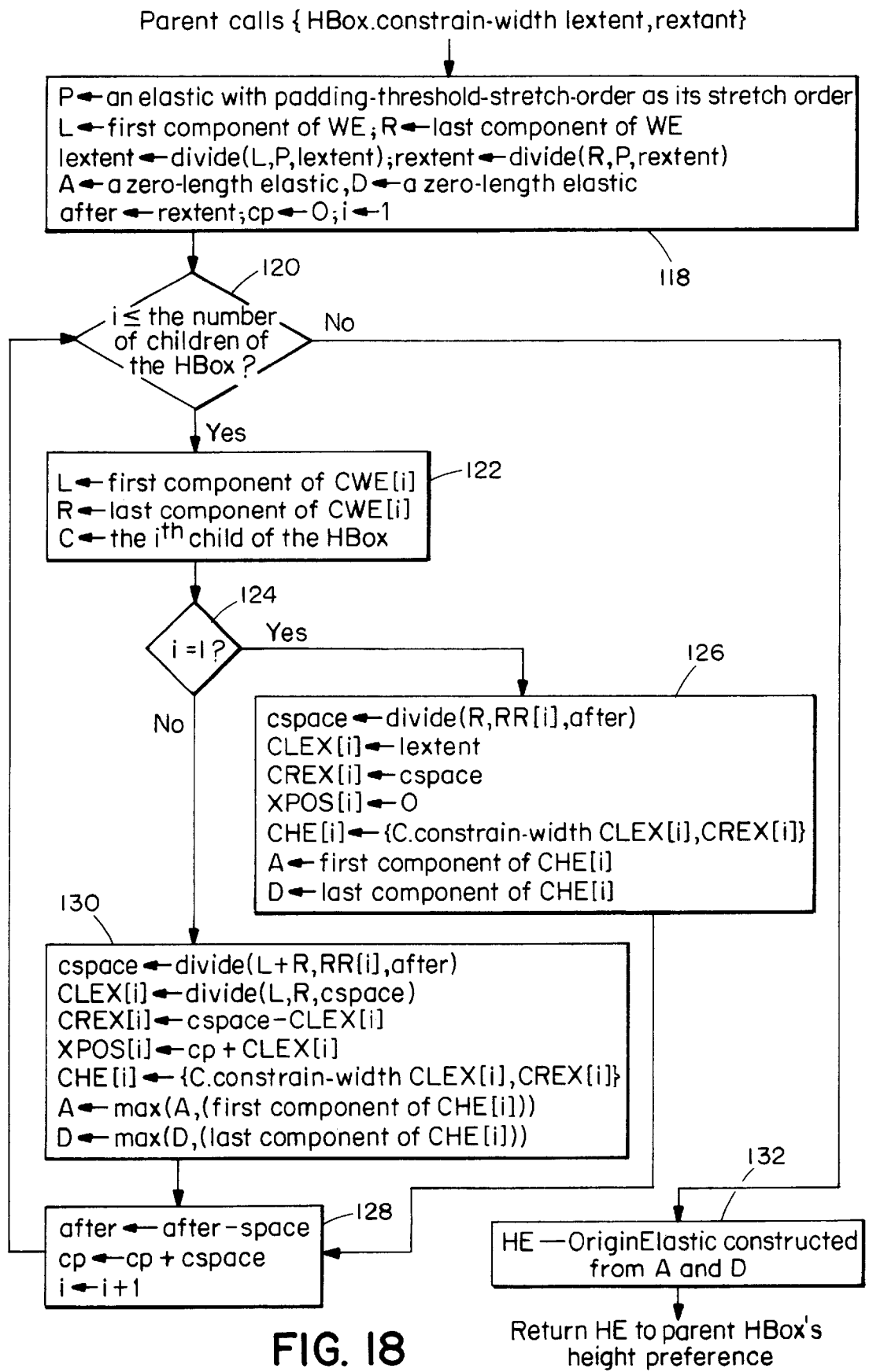
FIG. 18 is a flowchart illustrating a second pass for processing an HBox.

Yet other orders of calculation are possible. For example, the flow chart of FIG. 18 illustrates a method in which extents are calculated form left to right.

Curl also has a container known as VBox that works exactly like HBox, but with the roles of the horizontal and vertical dimensions interchanged.

Why the HBox and VBox Elastic Computations Work Correctly

The motivation for the particulars of the definitions of the elastic add and divide operations, given above, can be derived from the policy described above for computing the horizontal extents of component objects in an HBox. For one example, consider the situation if all five of the elastics AR, BL, BR, CL, and CR in the above example are equal. It then is intuitively desirable that all five of the extents ar, bl, br, cl, and cr be equal. In order for this to be true, the operation $$cr=\text{divide}(CR, AR+BL+BR+CL, r)$$

must yield a result that is $\frac{1}{5}$ of the value of r, and similarly the operation $$cl+cr=\text{divide}(CL+CR, AR+BL+BR, r)$$

must yield a result that is $\frac{2}{5}$ of the value of r. These desired results are in fact achieved by the definitions of add and divide given above because of three principal properties of the elastic that results from an add operation:

1. The result's preferred size is the sum of the operands' preferred sizes.
2. When the operands' stretch orders are equal, the result's stretchiness coefficient is the sum of the operands' stretchiness coefficients.
3. When the operands' compress orders are equal, the result's compressibility coefficient is the sum of the operands' compressibility coefficients.

Thus, in a sum of N equal elastics, the sum's preferred size, stretchiness coefficient, and compressibility coefficient are each N times the value of the corresponding property of the operand elastics. If the value r in a divide operation divide(A, B, r) is greater than the sum s of the preferred sizes of A and B, and the stretch orders of A and B are equal, then the divide operation will allocate the excess s−r between A and B in proportion to their stretchiness coefficients. The analogous property holds when a divide operation must apportion a deficit of space between two elastics with equal compress orders. These properties of the divide operation combine with the way that the add operation computes preferred sizes, stretchiness coefficients, and compressibility coefficients to insure that the above computations indeed produce the intuitively desirable results. If elastics did not have stretchiness coefficients or compressibility coefficients, these results could not be produced, since there would be no general way for the divide operation to understand that the sum AR+BL+BR+CL contains four units among which space will need to be allocated, whereas the sum AR+BL+BR contains only three.

For another example, consider the case where all of the elastics in question are equal, except that CL has a greater stretch order than all the others. Assume further that the distance r in the example is greater than the preferred size of AR+BL+BR+CL+CR, so there will be an excess of space to be allocated. Intuitively, it is desirable that all of the excess space be allocated to CL, since it has a larger stretch order than all the other elastics. In this case, it can be seen from the definition of the elastic add operation that any elastic sum that includes CL, such as CL+CR or AR+BL+BR+CL, will have the same stretch order as CL and will have a stretchiness coefficient equal to that of CL. On the other hand, an elastic sum that does not include CL, such as AR+BL+BR, will have a smaller stretch order and a stretchiness coefficient proportional to the number of summed elastics, as explained above. In this case, divide operations such as $$cr=\text{divide}(CR, AR+BL+BR+CL, r)$$

where CL is included in the right-hand operand will allocate all of the excess space to the right-hand operand and hence cr will equal the preferred size of CR. However, divide operations such as $$cl=\text{divide}(CL, AR+BL+BR, r-cr)$$

where CL is included in the left-hand operand will allocate all of the excess space to the left-hand operand and therefore cl will be equal to the preferred size of CL plus the amount of excess space to be allocated. Finally, divide operations such as $$br=\text{divide}(BR, AR+BL, r-cr-cl)$$

that include CL in neither operand will operate as described earlier. By following this logic, it can be seen that the design of the add and divide operations work together to ensure that the intuitively desirable outcome of allocating all of the excess space to CL will result no matter what order of divide operations is used to allocate a distance among a set of summed elastics, for example, no matter whether the first step is $$cr=\text{divide}(CR, AR+BL+BR+CL, r)$$

or $$cl+cr=\text{divide}(CL+CR, AR+BL+BR, r)$$

The same conclusion follows from the many other examples of this nature that could be constructed.

Grids and Tables

Figure 10:
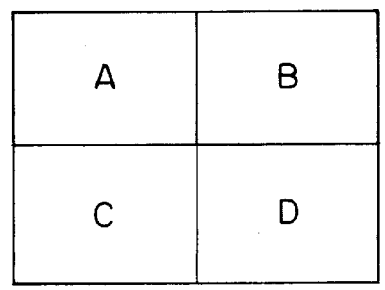
FIG. 10 illustrates a grid of four graphical objects.

Complex graphical layouts can be produced by nesting HBoxes and VBoxes inside each other. Curl also has Grid and Table containers, which can be used to produce layouts such as in FIG. 10 where the vertical alignment of A and C (and B and D) must be maintained as well as the horizontal alignment of A and B (and C and D). Such layouts cannot be produced simply by nesting HBoxes and VBoxes. Although Grid and Table can enforce richer collections of geometrical constraints than HBox and VBox, their geometry too is computed by successive applications of the basic elastic operations.

Fill Objects

It is frequently useful in producing graphical layouts to use Fill objects that perform no drawing operations but do have height and width preferences and do take up space. Rigid Fill objects can be used within HBoxes and VBoxes to put padding and/or indentation around other graphical objects. Stretchy Fill objects can be used for justification and centering purposes. For example, suppose one wishes to produce a table of contents such as the following:

| | |
|---|---|
| A Midsummer Night's Dream | 5 |
| The Tempest | 89 |
| The Two Gentlemen of Verona | 173 |

In Curl, this layout can be specified as a VBox containing one object for each line of the table of contents. Each line is in turn an HBox containing three objects: a text object containing a title, a Fill object whose width preference has a larger stretch order than that of a text object, and a text object containing a page number. The VBox will assign the same width to all of its child HBoxes, and each HBox in turn will place the title flush left and the page number flush right assigning all excess width to the Fill object because the stretch order of its width preference is the largest among the width stretch orders of all the graphical children of the HBox.

Stretchy Fill objects can also be used to center a graphical object within a graphical container larger than the graphical object to be centered. In this case, one stretchy Fill object is placed on each side of the object to be centered, as in the following Curl expression:

{HBox {Fill}, object, {Fill}}

Since the Fill objects have a greater stretch order than the other object, all excess width will be allocated to the Fill objects. If both Fill objects have identical stretch orders and stretchiness coefficients, then the excess will be divided equally between them. As a result, each Fill object will have the same width and the graphical object will be centered within the space taken up by the HBox. If the two Fill objects have the same stretch order but not the same stretchiness, then the excess space will be allocated in proportion to their stretchinesses, making possible other layouts such as one in which the space allocated to the left of an object is half as wide as the space allocated to its right.

The fact that Curl's elastics have stretch orders as well as stretchiness coefficients is crucial to the success of the above techniques. Without stretch orders, there would be no way to allocate all excess width to the Fill objects, and inevitably some fraction of the excess width would be allocated to the centered or justified objects, deforming them at least slightly.

Padding Elastics

Certain objects are intuitively considered to be "rigid," meaning that they are not to be stretched or squeezed except under the most extreme circumstances. For example, FIG.

11 shows three rectangles of different heights contained in an HBox. The HBox's height is equal to that of the tallest rectangle, but even though this is the case it would not be desirable to stretch the other rectangles to match the height of the HBox because rectangles are normally considered to be rigid objects. On the other hand, if a stretchy object such as a Fill object were included in the same HBox, it would be desired that the stretchy object stretch to the full height of the HBox.

These goals are achieved in Curl by using padding elastic to fill the areas into which rigid objects should not be stretched. For example, padding elastic is used above each of the rectangles in FIG. 11.

The padding elastic has a stretch order whose value is known as padding-threshold-stretch-order. All objects whose stretch order is less than padding-threshold-stretch-order are thus considered rigid (because the padding will stretch in preference to stretching the object). So that the width and height preferences of the HBox will accurately reflect those of the HBox's children, the padding elastic is not used in calculating the HBox's width and height preferences. However, when the time comes to allocate the HBox's assigned width and height among the HBox's children, the padding elastic is used as a device to avoid stretching rigid objects.

Figure 11:
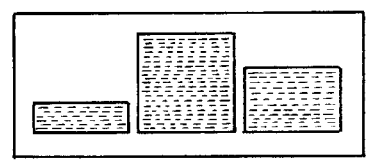
FIG. 11 illustrates the use of padding in an HBox containing three rectangles of different heights.
Figure 12:
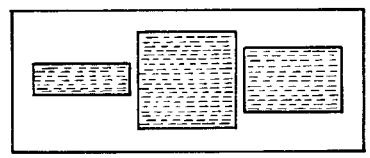
FIG. 12 illustrates the use of padding in an HBox containing centered rectangles of different heights.

The example in FIG. 11 aligns objects by their bottoms, so padding elastic is only needed above the objects. In other cases, such as in FIG. 12 where the objects are aligned by their centers, padding is needed both above and below each object.

A similar padding policy is used by VBox and by other containers that would otherwise have the potential of stretching rigid objects contained within them. Some Curl graphical containers have an option that can be used to disable the use of padding in special situations where the stretching of rigid objects is desired, but by default the padding is used.

The Use of Elastics by TextFlowBoxes

Curl's TextFlowBox container is the vehicle for displaying paragraphs of text formatted onto lines of a given length. Although a single TextFlowBox can contain many paragraphs of text, TextFlowBoxes containing a single paragraph are an important special case because many graphical displays such as tables contain blocks of text that can be treated as a single paragraph. The choice of elastics to use to describe a TextFlowBox's width and height preferences satisfies three goals:

1. In the absence of other constraints, a TextFlowBox should spread out far enough horizontally so that each of its paragraphs can be rendered on a single line.
2. If several TextFlowBoxes are contained in an HBox or a similar container (such as a row of a Table) and there is not enough space available for them all to be rendered as in (1), then the available space should be apportioned among the TextFlowBoxes in a way that causes their heights to be roughly equalized.
3. If several TextFlowBoxes are contained in a VBox or a similar container (such as a column of a Table), the width preferences of the VBox should be governed by the TextFlowBox that would be the widest when rendered as in (1).

Suppose a VBox contains two TextFlowBoxes, one of which contains a long paragraph and one of which contains a very short paragraph (such as a couple of words). This principle states that, in the absence of other constraints, the short paragraph should not "pull in" the horizontal bounds of the VBox in a way that forces the long paragraph to be rendered as several lines of text.

These design goals are met by computing a TextFlowBox's width elastic as follows. (A TextFlowBox's width preferences request that the TextFlowBox's origin be placed along its left-hand edge, so the elastic for the TextFlowBox's left extent is a highly rigid elastic whose preferred size is 0. Therefore, the width elastic described below is the elastic corresponding to the TextFlowBox's right extent.)

1. The minimum size is the width of the longest unbreakable text element (typically a word of text) within the TextFlowBox.
2. The preferred size is the width that would be required so that the longest paragraph within the TextFlowBox could be laid out as a single line of text, achieving objective (1) above.
3. The compressibility coefficient is proportional to the total amount of text in the TextFlowBox's longest paragraph—in other words, the length of the longest paragraph without including any fixed left or right indents for margins and the like.
4. The compress order is a standard value known as text-flow-compress-order.
5. The stretchiness coefficient is equal to the compressibility coefficient.
6. The stretch order is a standard value known as text-flow-stretch-order. Importantly, text-flow-stretch-order is greater than text-flow-compress-order and is less than padding-threshold-stretch-order.

The fact that text-flow-stretch-order is greater than text-flow-compress order achieves objective (3) above. Consider a case where two or more TextFlowBoxes of different sizes are contained in a VBox or a similar container, as specified in the description of objective (3). The elastic max operation will be performed on the width elastics of these TextFlowBoxes. Since the stretchiness of each TextFlowBox is infinitely greater than the compressibility of any of the TextFlowBoxes (because their stretch orders are greater than their compress orders), the rules for the elastic max operation dictate that the result will be equal to the width elastic that has the greatest preferred size, which will be that of the TextFlowBox that contains the longest paragraph.

The fact that text-flow-stretch-order is less than padding-threshold-stretch-order means that TextFlowBoxes act as rigid objects in the sense described above in the discussion of padding elastic. Thus, if a TextFlowBox appears in a context where more space is available than the preferred width of the TextFlowBox, the TextFlowBox will not be stretched horizontally unless the use of padding has been disabled. This policy conforms to normal notions of how to treat text, although it could be changed if desired by giving a TextFlowBox a width elastic with a stretch order greater than padding-threshold-stretch-order.

The compressibility coefficient in the TextFlowBox's width elastic is the parameter that enables the satisfaction of objective (2) above. The particular case that we choose to target is the case where each of the TextFlowBoxes in question consists of a single paragraph of text. This case is targeted because it is by far the most commonly occurring case in practical situations in which it is desired to equalize the height of neighboring TextFlowBoxes, notably when such TextFlowBoxes appear as components of a table.

This compressibility coefficient is derived based on the assumption that a given block of text occupies a constant area on the display—in other words, if the width is reduced, the height will increase so as to keep the product of width times height approximately constant, and vice versa. There are several reasons why text does not follow this model exactly, but the model is a fairly serviceable approximation. Consider two blocks of text P and Q that obey this model, such that the preferred width of P is p and the preferred width of Q is q. Consider further that these two blocks of text need to be laid out horizontally in a space of total width w, where w<p+q. We need to apportion the deficit d=(p+q)−w between P and Q in such a way that the heights of P and Q will be equalized. When the preferred widths of P and Q are proportional to their areas—which is true in the case we have been considering where each of P and Q contains a single paragraph of text—it can be shown that this desired apportionment allocates the deficit between P and Q in proportion to their areas. For example, if P has a greater area than Q, then a proportionately greater share of the deficit d should be allocated to P.

The satisfaction of objective (2) by the current Curl implementation is illustrated in FIGS. 14, 15, and 16, which show the appearance of a graphical hierarchy having the structure illustrated in FIG. 13 when it is constrained to each of three different widths. As shown in FIG. 13, the structure displayed in FIGS. 14–16 is an HBox containing three TextFlowBoxes, each one of which has a single paragraph of a different length. When laid out at its preferred width, the resulting appearance is shown in FIG. 14. Each TextFlow-Box has been given exactly the space needed to render it on a single line, which is the preferred appearance of a Text-FlowBox that contains a single paragraph. When the available width is reduced, the reduction is apportioned among the constituent TextFlowBoxes in proportion to their compressibility coefficients (i.e., in proportion to the length of text contained within them). FIG. 15 illustrates the situation that results when the width reduction is moderate, showing how the apportionment of this width reduction to each TextFlowBox leads to the desired layout in which all three boxes have comparable heights. FIG. 16 illustrates the result when the width reduction is more severe, illustrating once again how the apportionment of the reduction tends to keep the heights of the TextFlowBoxes equalized.

Because words are vary in length and line breaks can only occur between words (or perhaps at specific positions within hyphenated words), this policy will not always exactly equalize the heights of the TextFlowBoxes: it is fairly common to encounter marginal situations where one Text-FlowBox has just barely expanded to an additional line of text while other TextFlowBoxes have not. Also, once the width of a TextFlowBox has been reduced to a value equal to or less than the width of its longest word (or other unbreakable object), divergences from the ideal behavior become more common. Nevertheless, over a wide range of conditions the TextFlowBox width elastic described here performs well at keeping TextFlowBox heights equalized.

In a width-first layout negotiation, expressing the height preference of a TextFlowBox is straightforward because the width for the text is already known before the height preference needs to be computed. As a result, the TextFlow-Box's height preference is just a rigid elastic whose minimum and preferred sizes are both equal to the height actually required to display all the text.

Objective (2) above is difficult to satisfy when height-first layout negotiation is used, so in this case a TextFlowBox's size preferences are simply computed based on the assumption that it is a rigid object of the dimensions that would be required to lay out the contained text as described for objective (1) above.

Simple Rigid Objects

TextFlowBoxes are an example of a graphical object whose width and height are approximately inversely proportional to each other, but there are much simpler graphical objects, such as polygons and ellipses, that simply have a certain natural size and should not normally be deformed. The width and height preferences of these rigid objects are expressed by elastics of the following nature:

1. The minimum size is the natural size (width or height, as appropriate) of the object.
2. The preferred size is equal to the minimum size.
3. The compressibility coefficient is a standard value such as 1.
4. The compress order is a standard value known as minsize-stretch-order. minsize-stretch-order is less than text-flow-compress-order and is used as the compress order of all elastics where the preferred and minimum sizes are equal. In truth, it matters little what compress order or compressibility coefficient is used in such an elastic because the elastic divide operation will only allocate an elastic a space less than its minimum size under extreme conditions, no matter what the elastic's compress order and compressibility coefficient are.
5. The stretchiness coefficient is a standard value such as 1.
6. The stretch order is equal to text-flow-stretch-order.

The key properties of this elastic are

1. It strongly resists being compressed below the natural size of the object.
2. Since its stretch order is less than padding-threshold-stretch-order, it will not be stretched beyond its natural size when placed within a container such as HBox or VBox that uses padding elastic.
3. Since the stretch order of a rigid object is greater than the compress order of a TextFlowBox (and likewise the stretch order of the TextFlowBox is greater than the compress order of a rigid object), if a VBox contains some combination of TextFlowBoxes and rigid objects, none of the objects contained within the VBox will cause any other object within the VBox to be compressed to less than its preferred width.

During width-first layout negotiation, the height preference of a TextFlowBox is expressed as a rigid elastic whose natural size is the height required to lay out the text contained in the TextFlowBox, given the width that has been allocated for that TextFlowBox.

Constant-Aspect-Ratio Objects.

A third family of objects includes graphics such as images, which can be rendered at different sizes but which, for good appearance, must be rendered at a specified "aspect ratio" (the ratio of height to width). If the desired height and width are known in advance, such objects can be treated just like rigid objects. However, it is sometimes convenient to let the height and width be variable so that the object's size can accommodate to its surroundings. This can be achieved in the Curl layout system by providing a stretchy elastic during the first layout negotiation pass (e.g., providing a stretchy elastic as the width preference during a width-first layout negotiation). This stretchy elastic can have whatever parameters will result in the desired level of accommodation to the surrounding graphics. During the second layout negotiation pass, the size allocated during the first layout negotiation pass (e.g., the width, in the case of width-first layout negotiation) will be known. The size preference returned during the second layout negotiation pass can therefore be a rigid elastic whose natural size is computed using the object's aspect ratio and the size allocated during the first layout negotiation pass.

Overriding Elastics

It is sometimes useful to override the default width or height preference of an object. In Curl this can be done easily by means of the "width" and "height" options, thus:

{Fill width=2 cm, height=1 cm}

The values specified for these options can either be linear measurements (such as "2 cm" in the above example) or other elastic values. If the supplied width or height value is an OriginElastic, it is used directly as a substitute for the width or height preference that would otherwise be provided by the object. However, if the supplied value is not an OriginElastic, it is necessary to use the supplied value as a guide in modifying the OriginElastic supplied by the object to compute the OriginElastic that will actually be used for layout purposes by the object's graphical parent.

If the supplied width or height value is a linear measurement such as 2 cm, it is converted to a rigid elastic (as described above under "Simple Rigid Objects") whose natural size equals the linear measurement. Thus, there are only two cases to consider:

1. The case, already considered above, in which the supplied width or height value is an OriginElastic.
2. The case in which the supplied value is an elastic.

In this latter case, it is desirable to compute an OriginElastic having two properties:

1. The sum of its two component elastics (using the elastic add operation) equals the supplied width or height value.
2. Subject to constraint (1), the relationship between the two component elastics of the resulting OriginElastic corresponds as closely as possible to the relationship between the two component elastics of the OriginElastic originally supplied by the object to describe its width or height preference.

Since property (2), in particular, is a somewhat subjective criterion, there are several different ways of computing an OriginElastic that can be said to have these properties. The method outlined below is the method actually used in the Curl implementation and has proven to compute values that are reasonable for practical use. In the following description, A and B represent the "first" and "last" components of the original OriginElastic, T represents the elastic supplied as the width or height option value, and AA and BB represent the first and last components of the resulting OriginElastic. The method is described using Curl programming notation. The code uses two procedures (subroutines) distribute-stretch-to-components and distribute-stretch-to-first. Lines beginning with "|" vertical bars contain comments.

```
|| Fetch the parameters of T.
|| tmin is T's minimum size
|| tpref is T's preferred size
|| tcompress is T's compressibility coefficient
|| torderc is T's compress order
|| tstretch is T's stretchiness coefficient
|| torders is T's stretch order
let (tmin:gdim, tpref:gdim, tcompress:float, torderc:int,
    tstretch:float, torders:int) =
    {T.unpack-as-elastic}
|| Fetch the parameters of A.
|| amin is A's minimum size
|| apref is A's preferred size
|| acompress is A's compressibility coefficient
|| aorderc is A's compress order
|| astretch is A's stretchiness coefficient
|| aorders is A's stretch order
|| let (amin:gdim, apref:gdim, acompress:float, aorderc:int,
       astretch:float, aorders:int)=
       {A.unpack-as-elastic}
|| Fetch the parameters of B.
|| bmin is B's minimum size
|| bpref is B's preferred size
|| bcompress is B's compressibility coefficient
|| borderc is B's compress order
|| bstretch is B's stretchiness coefficient
|| borders is B's stretch order
let (bmin:gdim, bpref:gdim, bcompress:float, borderc:int,
    bstretch:float, borders:int)=
    {B.unpack-as-elastic}
|| Set amin to divide(A,B,tmin).
set amin={A.divide B, tmin}
set bmin=tmin-amin
let abpref:gdim=apref+bpref
let pref-excess:gdim=tpref-abpref
|| Set apref to divide(A,B,tpref).
set apref={A.divide B, tpref}
set bpref =tpref-apref
let ac:float
let ao:int
let bc:float
let bo:int
{if pref-excess<=0 then
    set ac=acompress
    set ao=aorderc
    set bc=bcompress
    set bo=borderc
else
    set ac=astretch
    set ao=aorders
    set bc=bstretch
    set bo=borders
}
|| If either A or B ends up with its min size equal to its
|| preferred size, adjust the compress orders if necessary
|| so that all of the compressibility of the total will be
|| allocated to the one that actually could shrink.
{if apref<=amin and bpref>bmin and ao>=bo then
    set ao=bo-1
}
{if bpref<=bmin and apref>amin and bo>=ao then
    set bo=ao-1
}
set (acompress, aorderc, bcompress, borderc)=
    {distribute-stretch-to-components
        ac, ao, bc, bo, tcompress, torderc}
let as:float
let ao:int
```

```
let bs:float
let bo:int
set as=astretch
set ao=aorders
set bs=bstretch
set bo=borders
set (astretch, aorders, bstretch, borders)=
    {distribute-stretch-to-components
    as, ao, bs, bo, tstretch, torders}
|| Assemble AA from its components:
|| amin becomes AA's minimum size
|| apref becomes AA's preferred size
|| acompress becomes AA's compressibility coefficient
|| aorderc becomes AA's compress order
|| astretch becomes AA's stretchiness coefficient
|| aorders becomes AA's stretch order
set AA=
    {pack-elastic
    amin, apref, acompress, aorderc, astretch, aorders}
|| Assemble BB from its components:
|| bmin becomes BB's minimum size
|| bpref becomes BB's preferred size
|| bcompress becomes BB's compressibility coefficient
|| borderc becomes BB's compress order
|| bstretch becomes BB's stretchiness coefficient
|| borders becomes BB's stretch order
set BB=
    {pack-elastic
    bmin, bpref, bcompress, borderc, bstretch, borders}
||| Define the distribute-stretch-to-components procedure:
    {define {distribute-stretch-to-components
        acoeff:float, aorder:int, bcoeff:float, border:int,
        tcoeff: float, torder:int}: {return float, int, float, int}
        {if aorder=border then
            set aorder=torder
            set border=torder
            let sum-coeff:float=acoeff+bcoeff
            let ratio:float=acoeff/sum-coeff
            set acoeff=tcoeff*ratio
            set bcoeff=tcoeff-acoeff
        elseif aorder>border then
            set (acoeff, aorder, bcoeff, border)=
                {distribute-stretch-to-first
                acoeff, aorder, bcoeff, border, tcoeff, torder}
        else
            set (bcoeff, border, acoeff, aorder)=
                {distribute-stretch-to-first
                bcoeff, border, acoeff, aorder, tcoeff, torder}
        }
        {return acoeff, aorder, bcoeff, border}
    }
||| Define the distribute-stretch-to-first procedure:
    {define {distribute-stretch-to-first
    acoeff:float, aorder:int, bcoeff:float, border:int,
    tcoeff:float, torder:int}: {return float, int, float, int}
        {if border>=torder then
            set border=torder-1
        }
        set aorder=torder
        set acoeff=tcoeff
        {return acoeff, aorder, bcoeff, border}
    }
```

Curl's Three-Pass Layout Negotiation Algorithm

As discussed earlier, Curl supports two layout negotiation orders: width-first and height-first. For applications in which text is formatted primarily into horizontal lines (e.g., when using Western languages), width-first negotiation generally yields better results, as illustrated in the above discussion of the width preferences for TextFlowBoxes. The following discussion describes width-first layout negotiation; the details for height-first negotiation are completely analogous except that the roles of width and height are interchanged.

Width-first layout negotiation with an object g begins when the object's parent calls g's get-width-preference method. This method is responsible for returning a pair of elastics (or information that can be converted to a pair of elastics) describing g's preferences for the amount of space to be allocated to its left and right extents. If g is a Box, this information will generally be derived by calling the get-width-preference method of each of g's graphical children and combining the results in a suitable way.

The next step in width-first layout negotiation with g occurs when g's constrain-width method is called. That method takes as arguments the left and right extent values that have been computed for g, and is responsible for returning a pair of elastics (or information that can be converted to a pair of elastics) describing g's preferences for the amount of space to be allocated to its ascent and descent. If g is a Box, this method will generally compute the left and right extents for each graphical child of g and then call each child's constrain-width method to obtain a height preference for each child. Those height preferences are then combined in a suitable way to yield g's height preference.

The final step in layout negotiation with g occurs when g's set-size method is called. That method receives as its argument a description of the left and right extents, as well as the ascent and descent, that have been allocated to g. g can make note of this information for future reference. If g is a Box, it is also expected to call the set-size methods on each of its graphical children with suitable arguments.

Since this layout negotiation strategy does not require information about height preferences until after width decisions have been made, it provides an opportunity for objects such as text blocks and pictures to defer deciding their height preferences until after their width allocations are known. In this way, paragraphs with word wrap and pictures with constant aspect ratios can both be formatted more intelligently.

Figure 17:
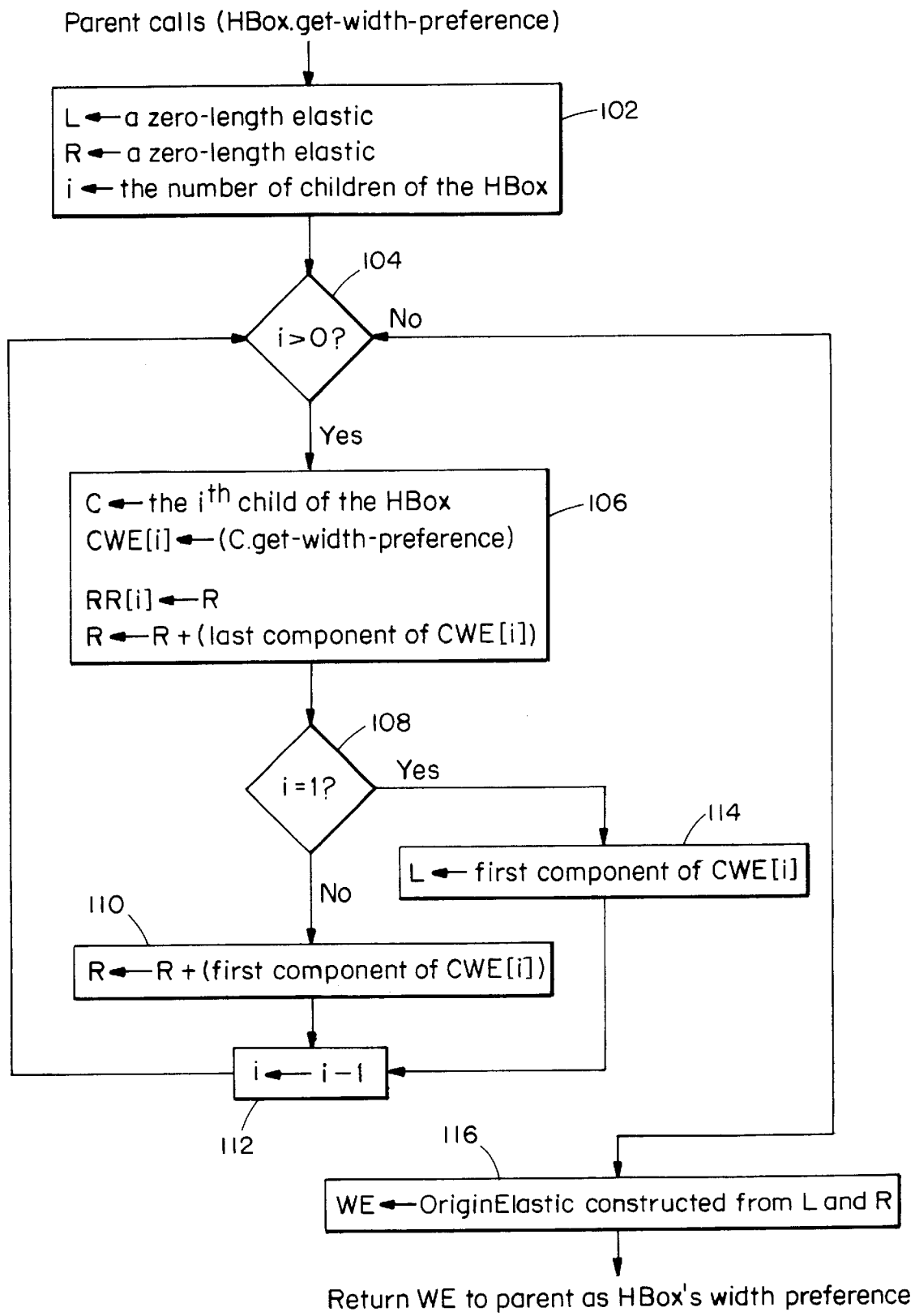
FIG. 17 is a flowchart illustrating a first pass in a three-pass method for processing an HBox.
Figure 19:
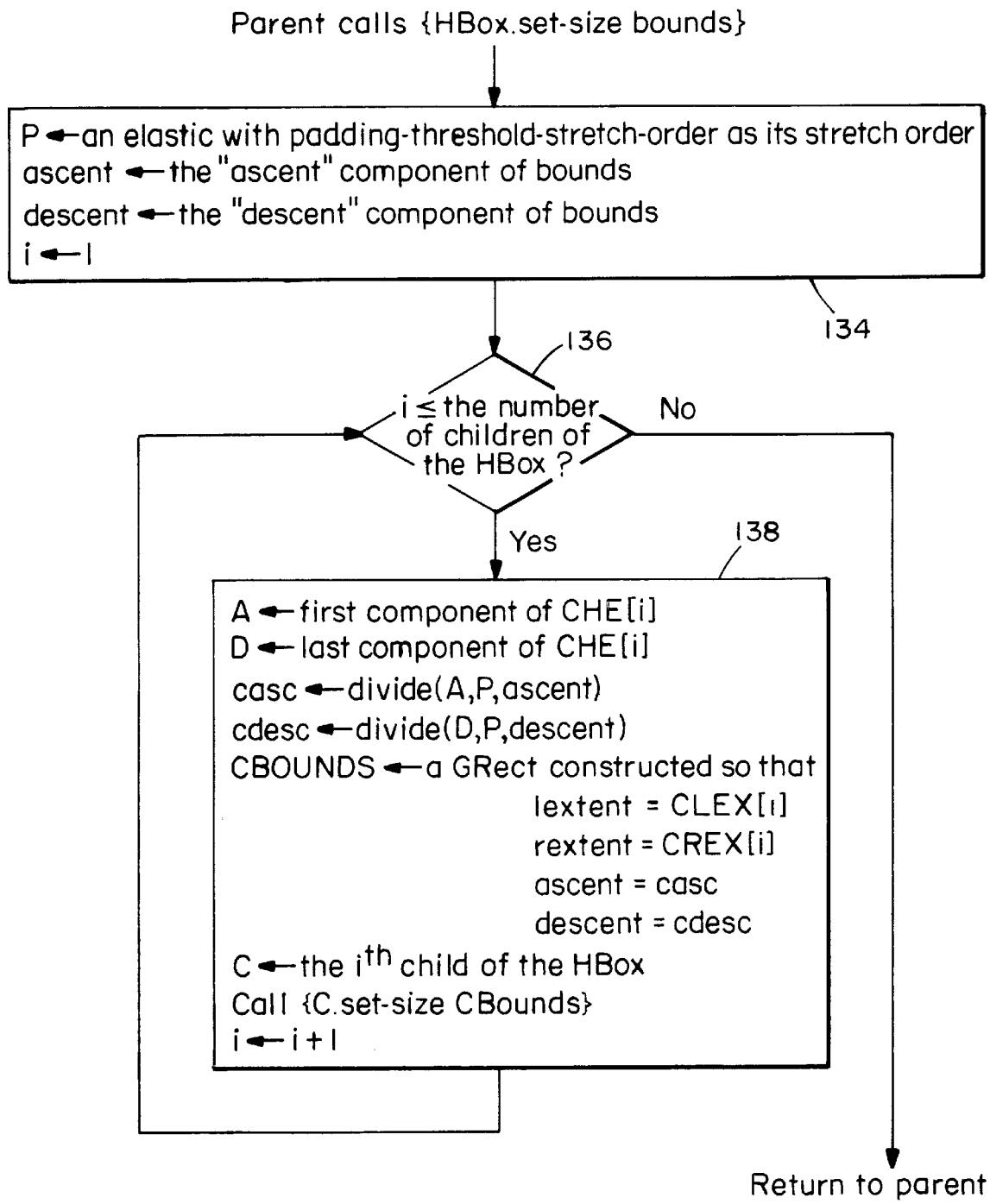
FIG. 19 is a flowchart illustrating a third pass in processing an HBox.

FIGS. 17, 18 and 19 present flowcharts explaining how HBox, a representative graphical container, handles layout. Each flowchart shows how HBox behaves during one of the three passes of a three-pass width-first layout negotiation. The behavior during a height-first layout negotiation is similar, although the detailed sequence of operations is different.

The methods of HBox that are called during the three phases of layout negotiation are as follows:

First pass: {HBox.get-width-preference}

Second pass: {HBox.constrain-width lextent:float, rextent:float}

Third pass: {HBox.set-size bounds:GRect}

The HBox.get-width-preference method returns an OriginElastic representing the width preference of the HBox, and the HBox.constrain-width method returns an OriginElastic representing the height preference of the HBox. The lextent and rextent arguments to HBox.constrain-width give the left and right extents that should be assumed for purposes of calculating the HBox's height preference. The GRect object that is supplied as an argument to HBox.set-size contains four floating-point numbers indicating the left and right extents, as well as the ascent and descent values representing the rectangular area that has been allocated to the HBox.

The flowcharts of FIGS. 17, 18 and 19 will now be described. It will be recognized that, since the graphical layout can be a complex tree, each object may be a parent object having a number of child components, and each of those child components may itself be a parent to its child components and so on to the leaves of the tree. Each of the flowcharts of FIGS. 17 through 19 represents the process in a child when the corresponding routine is called by its parent. Within each routine, the child makes the same call to each of its children. Thus, the call is passed from the root of the tree through to the leaves which return their respective results back through to the tree root.

The flowcharts are restricted to the case where the HBox aligns the origins of the contained objects and does not include the logic required to align bottoms, tops, or centers. Specifying the logic for an HBox with those added capabilities is a straightforward exercise. The flowcharts will be described relative to the simple example of FIG. 9 where a call is made to an HBox which in turn makes the calls to its three children A, B and C.

The computation is described using several variables that are understood to be private to the HBox, including the following:

A,D,L and R, elastics used for internal computations.

P, an elastic used for padding.

C, a pointer to a child graphical object of current interest.

i, an integer index variable.

CWE, an array of Origin Elastics that stores the width preferences received from child objects.

CHE, an array of Origin Elastics that stores the height preferences received from child objects.

RR, an array of elastics used for accumulating the width preference of the HBox.

lextent, rextent, ascent, descent, casc, cdesc, cp, after and cspace, numbers used to designate sizes or positions of graphical objects.

CLEX and CREX, arrays of left and right extent values, respectively, computed for the child objects.

XPOS, an array of x coordinates of the child objects' origins.

CBOUNDS, a GRect object.

Figure 20:
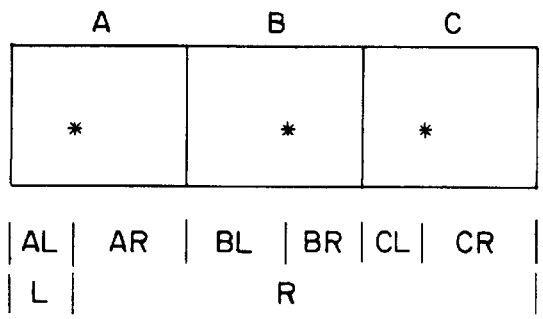
FIG. 20 presents an HBox of three graphical objects used in illustrating the method of FIG. 17.

When the parent to the HBox calls get-width-preference (FIG. 17), the HBox in this example returns a width elastic WE comprised of left and right elastics L and R. The left elastic of the HBox is the left elastic of object A, and the right elastic is the summation of the remaining elastics AR, BL, BR, CL and CR as illustrated in FIG. 20. To that end, the HBox itself makes the get-width-preference call to each of its children A, B and C to obtain their respective left and right elastics. More specifically, at 102, the left and right elastics of the HBox are initially set at zero and the number of children i of the HBox is set at 3. At 104, i is initially three and thus greater than zero, so the system continues to 106. At 106, the HBox makes the get-width-preference call to its child C (i=3) to receive CL and CR. The right elastic, still at zero, is stored at R[3] for reference in a subsequent method. The overall width preference of child C is also saved in CWE[3] for reference in a subsequent method. The right component CR of child C is added to the value R which serves as an accumulator for the right elastic of the HBox. (In the flowchart, the terms last component/first component refer to the right extent/left extent and descent/ascent, respectively, depending on whether a width-first or height-first process is being performed. In this example, last/first correspond to right/left.)

Still processing child C, at 108 i=3, so the left component CL of child C is added to the right component R of the HBox at 110. The index i is decremented at 112 and compared to zero at 104. In the next loop, BR and BL are similarly added to R at 106 and 110 and value RR[2] is saved. Specifically, RR[2] is the sum of the left and right elastics of child C.

In the final loop of this example, child A is processed. The value RR[1] is the sum of the left and right elastics of children B and C. Right elastic AR is added to the right elastic R of the HBox at 106, but at 108, the system goes to 114. Thus, the left elastic AL of the final child A becomes the left elastic of the HBox. Finally, with i decremented to zero at 112, the left and right elastics L and R construct the OriginElastic WE. That OriginElastic for the HBox is returned to its parent. The value is passed back up the tree through the get-width-preference routines of parents to the root of the tree.

The width constraints are then passed back down through the tree through the constrain-width call (FIG. 18) causing the HBox to return an OriginElastic HE constructed from a computed ascent and descent.

Figure 21A:
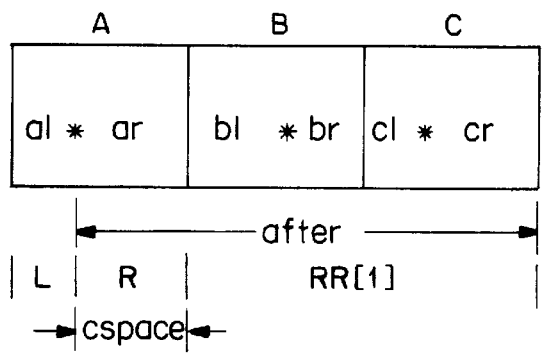
FIGS. 21A and 21B illustrate the method of FIG. 18.

Upon receipt of the constrain-width call, the HBox performs the method of FIG. 18. Based on the left and right elastics computed in the method of FIG. 17 and on a padding elastic for the HBox, at 118, the padding is removed from the lextent and rextent (left and right extent distance included in the parent call) through the divide operation. An ascent and a descent are initialized at zero, as is a cursor position value cp. The constrain-width process processes children from left to right, and cp defines the left edge of the next region to be allocated, counting right from the origin of the HBox. The child index i is set at 1 for left to right processing. The value "after" is a distance to be divided among the children and is initially set at rextent (FIG. 21A).

At 120, i is less than the number 3 of children of the HBox and the system continues to 122. At 122, the left and right elastics of child A are stored at L and R. At 124, i=1 for the first child A and the system goes to 126. At 126, the HBox computes the lextent CLEX[1] and rextent CREX[1] to be forwarded to the child A in a constrain-width call. The lextent to be forwarded to the first child A is the lextent received by the HBox. With lextent allocated to CLEX[1], cp is incremented by lextent The rextent to be forwarded to the child A is a value cspace which is computed by the divide operation. As illustrated in FIG. 21A, the "after" distance, which at this point in the method is equal to the received rextent, must be divided between the right elastic R of child A and the accumulated width preference RR[1] of children B and C determined in the first pass. The portion of "after" allocated to the elastic R is the value cspace.

The value cspace is then forwarded to the child A as its constrained rextent. Returned from the child A is the child height OriginElastic which defines the ascent and descent elastics A and D. A value XPOS[1] which sets the distance of the child origin relative to the HBox origin is set for child A at zero since the origin of an HBox is defined to be the same as the origin of the leftmost child.

Figure 21B:
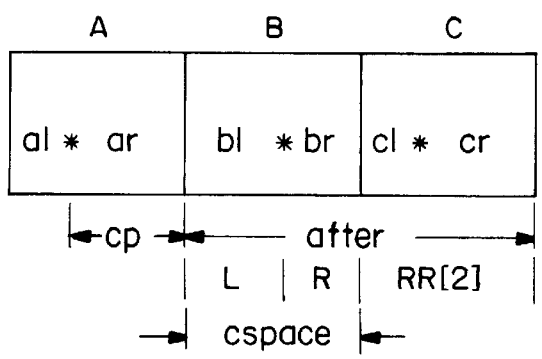

At 128, the cursor pointer cp is incremented by cspace to the left edge of A, and the child index i is incremented by one. The distance "after" remaining to be allocated is computed by subtracting cspace of FIG. 21A from "after" of that Figure to provide a distance to be allocated among the left and right extents of B and C as illustrated in FIG. 21B.

From 120, the method returns to 122 to process the second child B. The left and right elastics for child B which were computed in the method of FIG. 17 define L and R (FIG. 21B). Since the first child has been processed, the method proceeds from 124 to 130. The cspace to be allocated is then computed by dividing the distance "after" between L+R and RR[2]. The value cspace is then divided according to the left and right elastics L and R of the child B to define CLEX[2], and the difference between cspace and CLEX[2] defines CREX[2]. The position of the origin of child B XPOS[2] is defined by adding CLEX[2] to the left edge of child B defined by cp. The HBox also provides a constrain-width call to child B to constrain child B to the computed CLEX[2] and CREX[2] and to receive from child B its ascent and descent elastics. The ascent and descent elastics A and D for the HBox are then defined through the max operation applied to the present ascent and descent values A and D of the HBox and the ascent and descent values returned from child B.

In the next loop, the method similarly processes the third child C in steps 122 and 130. The HBox then returns its height OriginElastic which is the maximum ascent and maximum descent for the three children A, B and C.

Figure 22:
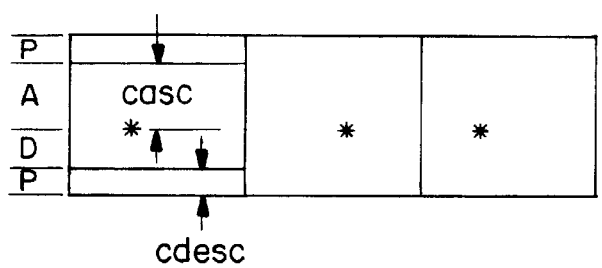
FIG. 22 illustrates the method of FIG. 19.

FIG. 19 illustrates the set-size method by which the HBox is provided with the values of its left extent, right extent, ascent and descent and by which the HBox passes the appropriate values to each of its children. At 134, the appropriate padding for the HBox is stored at P. Ascent and descent are taken from the components provided in the call from the parent, and the child index i is set at one. For the first child, the method passes through the decision 136 to 138. At 138, the ascent and descent elastics A and D for the child A are defined by the corresponding components of the child height elastic, saved from the computation of FIG. 18. The child ascent and child descent casc and cdesc are then computed by the divide operation which divides the bounded ascent and descent according to the ascent, descent and padding elastics (FIG. 22). The child bounds are then defined for the child from the extents previously constrained in the constrain-width method (FIG. 18) and the just computed child ascent and descent. Those bounds are then presented to the child through a set-size call, and the child index is incremented by one. Once each child has been bounded, the method returns to the parent from decision 136.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of processing graphical objects having content to layout the graphical objects comprising:
    defining stretch properties of the graphical objects having content;
    defining compression properties of the graphical objects having content, distinct from the stretch properties, such that the graphical objects can stretch and compress at different rates in response to a resize operation on the graphical object; and
    processing properties of the graphical objects having content, including the stretch and compression properties, to define individual layouts of the graphical objects within an overall graphical layout.

2. A method as claimed in claim 1 wherein the stretch properties comprise stretchiness coefficients to be applied to sizes designated for the graphical objects and the compression properties comprise compressibility coefficients to be applied to the sizes designated for the graphical objects.

3. A method as claimed in claim 2 wherein the stretch properties and compression properties respectively comprise stretch orders and compression orders to indicate substantial relative differences between stretchiness and compressibility relative to other graphical objects.

4. A method as claimed in claim 3 further comprising defining preferred sizes of the graphical objects and minimum sizes specified independently of the stretch and compression properties, and processing the minimum and preferred sizes to define individual layouts.

5. A method as claimed in claim 4 further comprising defining stretch and compression properties of the graphical objects through compact representations of graphical objects sharing like stretch and compression properties.

6. A method as claimed in claim 3 wherein the processing step comprises performing an add operation in which the stretchiness and compressibility coefficients of plural graphical objects are summed dependent on the relative stretch and compression orders.

7. A method of processing graphical objects having content to layout the graphical objects comprising:
    defining stretch properties of the graphical objects having content, the stretch properties comprising stretchiness coefficients to be applied to sizes designated for the graphical objects and stretch orders to indicate substantial relative differences between stretchiness relative to other graphical objects;
    defining compression properties of the graphical objects having content, the compression properties comprising compressibility coefficients to be applied to the sizes designated for the graphical objects and compression orders to indicate substantial relative differences between compressibility relative to other graphical objects, distinct from the stretch properties;
    processing properties of the graphical objects having content, including the stretch and compression properties, to define individual layouts of the graphical objects within an overall graphical layout, including performing an add operation in which the stretchiness and compressibility coefficients of plural graphical objects are summed dependent on the relative stretch and compression orders; and
    wherein the stretchiness and compressibility coefficients, respectively, are summed if the respective stretch and compression orders are equal and, if the respective stretch and compression orders are not equal, the stretchiness and compressibility coefficients of the graphical objects indicated to be most elastic by the stretch and compression orders are taken as an add result.

8. A method as claimed in claim 7 wherein the stretch and compress orders, respectively, having the greatest elasticity are taken as the add result.

9. A method as claimed in claim 6 wherein the stretch and compress orders, respectively, having the greatest elasticity are taken as an add result.

10. A method as claimed in claim 3 wherein the step of processing comprises performing a max operation which selects a size from two graphical objects which is dependent on the relative compressibility and stretchability of the graphical objects.

11. A method of processing graphical objects having content to layout the graphical objects comprising:
    defining stretch properties of the graphical objects having content, the stretch properties comprising stretchiness coefficients to be applied to sizes designated for the graphical objects;

defining compression properties of the graphical objects having content, distinct from the stretch properties, the compression properties comprising compressibility coefficients to be applied to the sizes designated for the graphical objects;

processing properties of the graphical objects having content, including the stretch and compression properties, to define individual layouts of the graphical objects within an overall graphical layout and performing a max operation which selects a size from two graphical objects which is dependent on the relative compressibility and stretchability of the graphical objects;

wherein the stretch properties and compression properties respectively comprise stretch orders and compression orders to indicate substantial relative differences between stretchiness and compressibility relative to other graphical objects; and wherein a result of the max operation is the size of one of the two graphical objects whose elasticity toward the size of the other of the two graphical objects is the least.

12. A method as claimed in claim 11 wherein the stretch and compression properties of the result of the max operation are selected from the one of the two graphical objects from which size was selected or, if the size of the two graphical objects is the same, from the one of the two graphical objects which was least elastic.

13. A data structure in a data processing system defining elastics for layout of a graphical object having content comprising:

a size value of the graphical object having content;

a stretch property of the graphical object having content; and a compression property of the graphical object having content independent of the stretch property, providing for the graphical object to stretch and compress at different rates in response to a resize operation on the graphical object.

14. A data structure as claimed in claim 13 wherein the stretch and compression properties include stretchiness and compressibility coefficients and stretch and compress orders which indicate substantial relative differences in elasticity between graphical objects.

15. A data structure as claimed in claim 14 further comprising preferred size and minimum size specified independently of the stretch and compression properties.

16. A data structure as claimed in claim 15 comprising a compact representation of stretchiness and compressibility of graphical objects sharing common stretchiness and compressibility coefficients.

17. A data structure as claimed in claim 13 further comprising both minimum and preferred size values.

18. A data processing system comprising:

means for defining stretch properties of graphical objects having content;

means for defining compression properties of the graphical objects having content distinct from the stretch properties, such that the graphical objects can stretch and compress at different rates in response to a resize operation on the graphical object; and means for processing properties of the graphical objects having content, including the stretch and compression properties, to define individual layouts of the graphical objects within an overall graphical layout.

19. A system as claimed in claim 18 wherein the stretch properties comprise stretchiness coefficients to be applied to sizes designated for the graphical objects and the compression properties comprise compressibility coefficients to be applied to the sizes designated for the graphical objects.

20. A system as claimed in claim 19 wherein the stretch properties and compression properties respectively comprise stretch orders and compression orders to indicate substantial relative differences between stretchiness and compressibility relative to other graphical objects.

21. A system as claimed in claim 20 further comprising means for defining preferred sizes of the graphical objects and minimum sizes specified independently of the stretch and compression properties and means for processing the minimum and preferred sizes to define individual layouts.

22. A system as claimed in claim 21 further comprising means for defining stretch and compression properties of the graphical objects through compact representations of graphical objects sharing like stretch and compression properties.

23. A system as claimed in claim 19 wherein the processing step comprises performing an add operation in which the stretchiness and compressibility coefficients of plural graphical objects are summed dependent on the relative stretch and compression orders.

24. A data processing system comprising:

means for defining stretch properties of graphical objects having content, the stretch properties comprising stretchiness coefficients to be applied to sizes designated for the graphical objects;

means for defining compression properties of the graphical objects having content distinct from the stretch properties, the compression properties comprising compressibility coefficients to be applied to the sizes designated for the graphical objects;

means for processing properties of the graphical objects having content, including the stretch and compression properties, to define individual layouts of the graphical objects within an overall graphical layout, including performing an add operation in which the stretchiness and compressibility coefficients of plural graphical objects are summed dependent on the relative stretch and compression orders; and wherein the stretchiness and compressibility coefficients, respectively, are summed if the respective stretch and compression orders are equal and, if the respective stretch and compression orders are not equal, the stretchiness and compressibility coefficients of the graphical objects indicated to be most elastic by the stretch and compression orders are taken as an add result.

25. A system as claimed in claim 24 wherein the stretch and compress orders, respectively, having the greatest elasticity are included in the add result.

26. A system as claimed in claim 23 wherein the stretch and compress orders, respectively, having the greatest elasticity are taken as an add result.

27. A system as claimed in claim 19 wherein the means for processing comprises means for performing a max operation which selects a size from two graphical objects which is dependent on the relative compressibility and stretchability of the graphical objects.

28. A data processing system comprising:

means for defining stretch properties of graphical objects having content, the stretch properties comprising stretchiness coefficients to be applied to sizes designated for the graphical objects;

means for defining compression properties of the graphical objects having content distinct from the stretch properties, the compression properties comprising compressibility coefficients to be applied to the sizes designated for the graphical objects;

means for processing properties of the graphical objects having content, including the stretch and compression properties, to define individual layouts of the graphical objects within an overall graphical layout and for performing a max operation which selects a size from two graphical objects which is dependent on the relative compressibility and stretchability of the graphical objects; and wherein a result of the max operation is the size of one of the two graphical objects whose elasticity toward the size of the other of the two graphical objects is the least.

29. A system as claimed in claim 28 wherein the stretch and compression properties of the result of the max operation are selected from the one of the two graphical objects from which size was selected or, if the size of the two graphical objects is the same, from the one of the two graphical objects which is least elastic.

* * * * *